US010000209B2

(12) United States Patent
Takaso et al.

(10) Patent No.: US 10,000,209 B2
(45) Date of Patent: Jun. 19, 2018

(54) VEHICLE STEERING CONTROL APPARATUS

(71) Applicant: SUBARU CORPORATION, Tokyo (JP)

(72) Inventors: Yasushi Takaso, Tokyo (JP); Takashi Kubo, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 128 days.

(21) Appl. No.: 15/157,057

(22) Filed: May 17, 2016

(65) Prior Publication Data

US 2016/0355212 A1   Dec. 8, 2016

(30) Foreign Application Priority Data

Jun. 2, 2015 (JP) ................................. 2015-112502

(51) Int. Cl.
*B60W 30/12* (2006.01)
*B62D 1/28* (2006.01)
*B62D 15/02* (2006.01)

(52) U.S. Cl.
CPC ............... *B60W 30/12* (2013.01); *B62D 1/28* (2013.01); *B62D 15/025* (2013.01)

(58) Field of Classification Search
CPC ........ B60W 30/12; B62D 15/025; B62D 1/28
See application file for complete search history.

(56) References Cited

U.S. PATENT DOCUMENTS 5,350,912 A * 9/1994 Ishida ..................... B62D 6/00
                                                             180/170
5,367,457 A * 11/1994 Ishida ................. G05D 1/0212
                                                             180/169
(Continued)

FOREIGN PATENT DOCUMENTS

JP       2002-019633 A       1/2002
JP       2008-049747 A       3/2008
(Continued)

OTHER PUBLICATIONS

Office Action issued in corresponding Japanese Patent Application No. 2015-112502, dated Nov. 8, 2016.

*Primary Examiner* — Mary D Cheung
(74) *Attorney, Agent, or Firm* — McDermott Will & Emery LLP

(57) ABSTRACT

A vehicle steering control apparatus includes a target course setter, a first control quantity calculator, a second control quantity calculator, a control rate variator, and a steering controller. The target course setter sets, based on forward environment information, a target course to be traveled by an own vehicle. The first control quantity calculator calculates a first control quantity that allows the own vehicle to travel along the target course. The second control quantity calculator calculates a second control quantity based on a steering angle. The control rate variator variably sets, in accordance with a vehicle speed, a first rate of the first control quantity and a second rate of the second control quantity. The steering controller calculates a steering control quantity, based on the first control quantity corrected based on the first rate and the second control quantity corrected based on the second rate, and executes a steering control.

17 Claims, 8 Drawing Sheets

(56) References Cited

U.S. PATENT DOCUMENTS

| | | | |
|---|---|---|---|
| 5,913,910 A * | 6/1999 | Ochi | B60T 8/1755 701/1 |
| 2003/0182038 A1* | 9/2003 | Iwazaki | B62D 1/28 701/41 |
| 2005/0027415 A1* | 2/2005 | Iwazaki | B62D 15/0285 701/36 |
| 2005/0240328 A1* | 10/2005 | Shirato | B62D 1/286 701/41 |
| 2005/0240332 A1* | 10/2005 | Mori | B60T 8/1755 701/72 |
| 2006/0030987 A1* | 2/2006 | Akita | B62D 15/025 701/41 |
| 2007/0192006 A1* | 8/2007 | Kimura | B60K 26/021 701/45 |
| 2007/0288142 A1* | 12/2007 | Maeda | B62D 1/286 701/41 |
| 2007/0288144 A1* | 12/2007 | Arima | B62D 5/0481 701/41 |
| 2009/0171533 A1* | 7/2009 | Kataoka | B60W 30/12 701/41 |
| 2009/0194350 A1 | 8/2009 | Rattapon et al. | |
| 2010/0204887 A1* | 8/2010 | Ichinose | B60L 15/2036 701/41 |
| 2012/0123642 A1* | 5/2012 | Kojo | B62D 5/008 701/41 |
| 2012/0203431 A1 | 8/2012 | Kojo et al. | |
| 2012/0245797 A1* | 9/2012 | Ono | B62D 6/003 701/42 |
| 2015/0019082 A1* | 1/2015 | Inoue | B62D 1/286 701/41 |
| 2015/0088382 A1* | 3/2015 | Obuchi | B60K 31/00 701/41 |
| 2015/0344033 A1* | 12/2015 | Fukuda | B60W 30/16 701/117 |
| 2016/0200317 A1* | 7/2016 | Danzl | B60K 28/06 701/25 |

FOREIGN PATENT DOCUMENTS

| | | |
|---|---|---|
| JP | 2010-036757 A | 2/2010 |
| WO | 2011/161777 A1 | 12/2011 |

* cited by examiner

VEHICLE STEERING CONTROL APPARATUS

CROSS-REFERENCE TO RELATED APPLICATIONS

The present application claims priority from Japanese Patent Application No. 2015-112502 filed on Jun. 2, 2015, the entire contents of which are hereby incorporated by reference.

BACKGROUND

The technology relates to a vehicle steering control apparatus that may set a target course and may perform a control to allow for follow-up travel along the target course.

In recent years, various developments and proposals have been made in vehicle steering control technology to assist drivers in driving more comfortably and safely. For example, Japanese Unexamined Patent Application Publication (JP-A) No. 2010-36757 discloses a technique regarding a lane deviation prevention control apparatus that prevents an own vehicle from deviating from lanes. This technique involves: calculating a target steering angle of a steering mechanism to allow a lateral position of an own vehicle to be close to a target lateral position; setting a first steering force to attain the target steering angle, based on a deviation between the target steering angle and a real steering angle, by means of a steering angle feedback control; and setting a second steering force to attain the target steering angle, by means of a feedforward control of a steering force based on the target steering angle and an amount of a vehicle status. When determination is made on follow-up travel to a preceding vehicle, a target steering force is so set as to raise a rate of the first steering force, as compared to a case in which no determination is made on the follow-up travel.

SUMMARY

A technique such as the lane deviation prevention control as disclosed in JP-A No. 2010-36757 or any other lane keeping control may involve setting a target course, and performing a follow-up control to a preceding vehicle or the target course. In such cases, steering characteristics of a steering system may vary in accordance with a vehicle speed. Accordingly, in an existing control system, to perform a control based on the steering characteristics with the vehicle speed being in a medium- or high-speed range may cause a concern of degraded control responsiveness in a low-speed range. Such a change in the control responsiveness between the low-speed range and the medium- or high-speed range may lead to lack of control stability, causing difficulties in performing a precise control.

It is desirable to provide a vehicle steering control apparatus that makes it possible to perform a stable and precise control with alleviated changes in control responsiveness over low- to high-speed ranges.

An aspect of the technology provides a vehicle steering control apparatus that includes a target course setter, a first control quantity calculator, a second control quality calculator, a control rate variator, and a steering controller. The target course setter sets, based on forward environment information, a target course to be traveled by an own vehicle. The first control quantity calculator calculates a first control quantity that allows the own vehicle to travel along the target course. The second control quantity calculator calculates a second control quantity based on a steering angle. The control rate variator variably sets, in accordance with a vehicle speed, a first rate of the first control quantity and a second rate of the second control quantity. The steering controller calculates a steering control quantity, based on the first control quantity corrected based on the first rate and the second control quantity corrected based on the second rate, and executes a steering control.

DETAILED DESCRIPTION

In the following, some implementations of the technology are described in detail with reference to the drawings.

Figure 1:
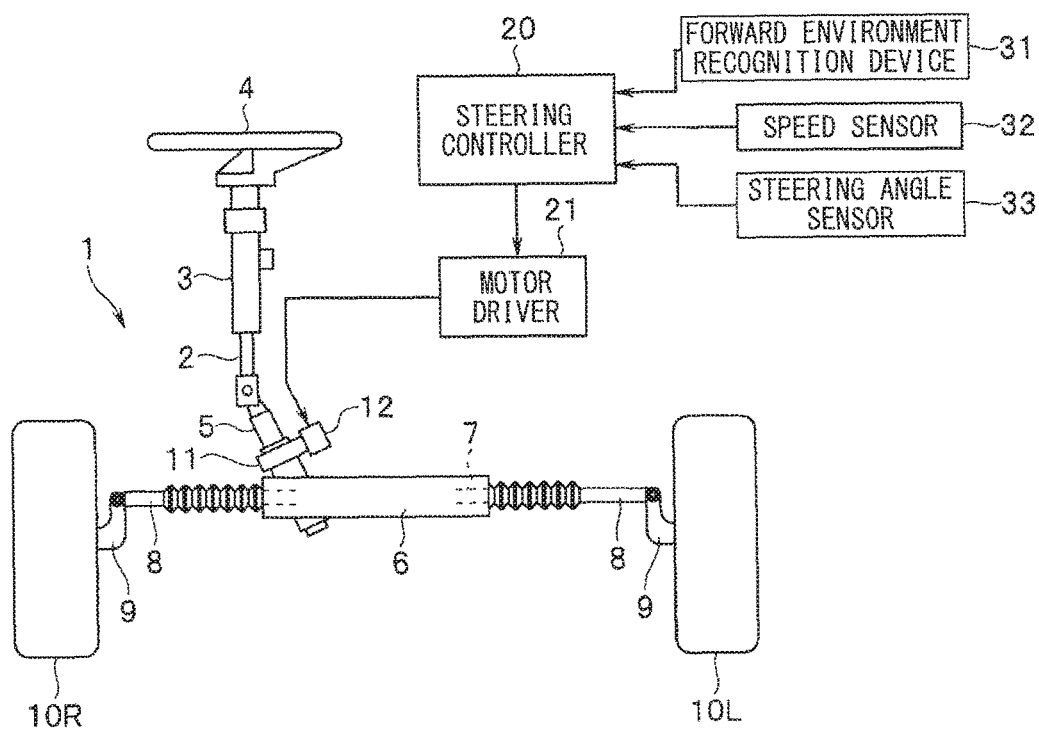
FIG. 1 illustrates a configuration of a vehicle steering system according to an implementation of the technology.

In FIG. 1, a reference character 1 designates an electric power steering apparatus that may freely set a steering angle independently from a driver's input. The electric power steering apparatus 1 may include a steering shaft 2. The steering shaft 2 may be rotatably supported by an undepicted vehicle frame through a steering column 3. The steering shaft 2 may include a first end extended toward a driver's seat, and a second end extended toward an engine room. A steering wheel 4 may be fixed to the first end of the steering shaft 2. A pinion shaft 5 may be coupled to the second end of the steering shaft 2.

In the engine room, a steering gear box 6 may be disposed. The steering gear box 6 may be extended in a vehicle widthwise direction. A rack shaft 7 may be reciprocatably inserted into and supported by the steering gear box 6. The rack shaft 7 may be provided with a rack (not illustrated) with which a pinion of the pinion shaft 5 may be engaged to form a rack-and-pinion steering gear mechanism.

Both right and left ends of the rack shaft 7 may be protruded out of respective ends of the steering gear box 6. Each of the right and the left ends of the rack shaft 7 may be coupled to a front knuckle 9 with a tie rod 8. The front knuckles 9 may rotatably support right and left wheels 10L and 10R. In one implementation, the right and the left wheels 10L and 10R may serve as steering wheels. The front knuckles 9 may be so supported by the vehicle frame as to provide free steering. To operate the steering wheel 4 may therefore cause the steering shaft 2 and the pinion shaft 5 to rotate. The rotation of the pinion shaft 5 may cause the rack shaft 7 to move rightward or leftward. This movement may cause the front knuckles 9 to rotate around a king pin shaft (not illustrated), allowing the right and the left wheels 10L and 10R to be steered rightward or leftward.

An electric power steering motor (or an electric motor) 12 may be further coupled to the pinion shaft 5 through an assist transmission mechanism 11. The electric motor 12 may be provided for assistance of a steering torque to be applied to the steering wheel 4, and addition of a steering torque to attain a setup target steering angle. The electric motor 12 may be driven by a motor driver 21, based on a control torque $T_T$ outputted from a steering controller 20 to be described later and received by the motor driver 21. In one implementation, the control torque $T_T$ may serve as a "steering control quantity".

The steering controller 20 may be coupled to, for example, a forward environment recognition device 31, a speed sensor 32, and a steering angle sensor 33. The forward environment recognition device 31 recognizes environment in front of a vehicle to obtain forward environment information. The speed sensor 32 may detect a vehicle speed V. The steering angle sensor 33 may detect a steering angle (i.e., a real steering angle) $\theta_H$.

The forward environment recognition device 31 may include, for example, a pair of cameras and an image processor. The pair of cameras may be spacedly attached to a front part of a ceiling of a vehicle interior, and may perform stereo imaging of objects outside a vehicle from different viewpoints. The image processor may perform processing on image data from the cameras.

In the stereo image processor of the forward environment recognition device 31, the processing on the image data from the cameras may be carried out as follows. First, the cameras may perform imaging to generate a pair of stereo images in a direction of travel of an own vehicle. Based on an amount of displacement of corresponding positions in the pair of stereo images, distance information may be obtained. Thus, a distance image may be generated.

Figure 6:
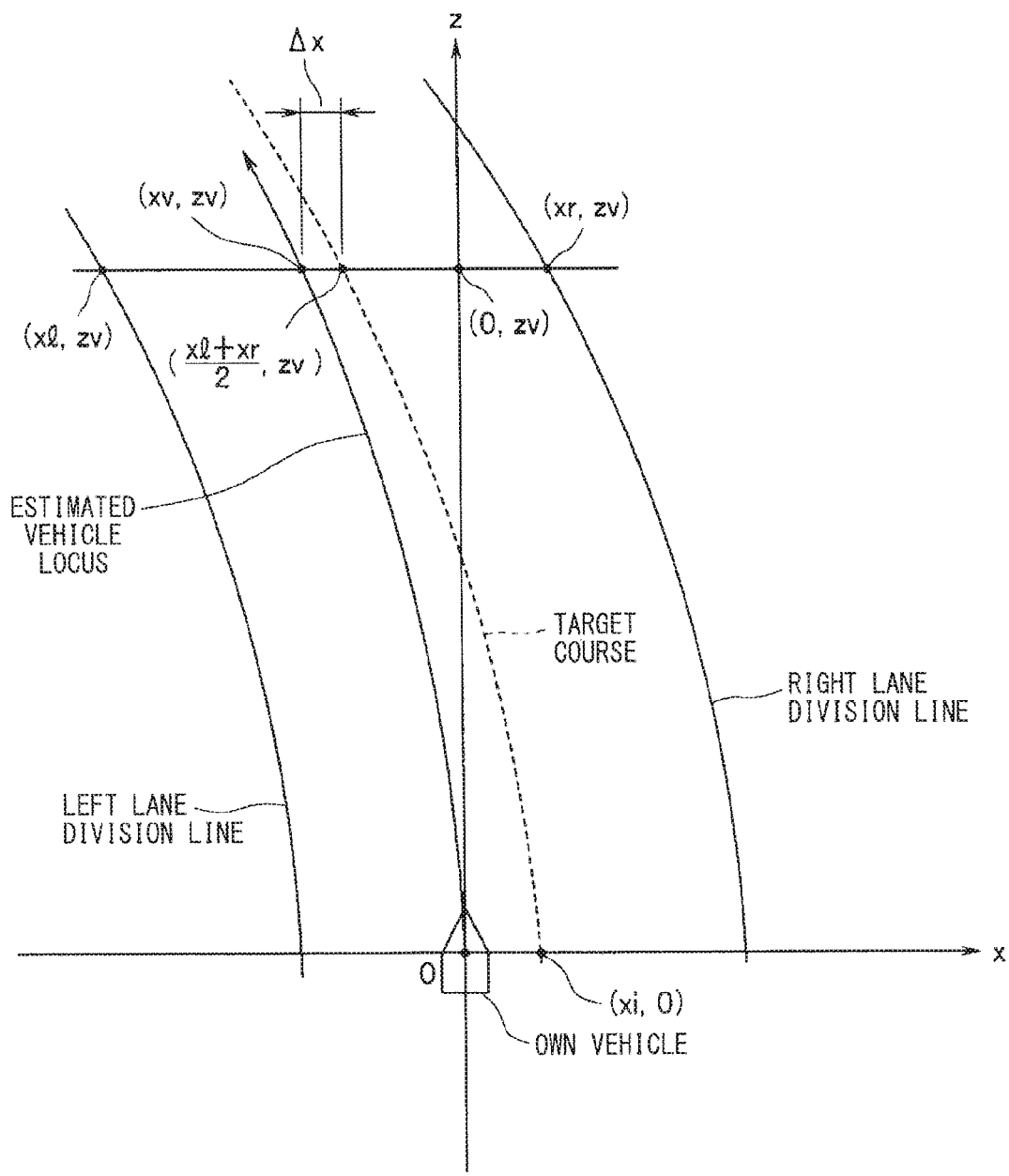
FIG. 6 illustrates a lateral position feedback control according to an implementation of the technology.

In data recognition of a lane division line such as a lane line, a lane division line may have higher luminance than that of a road surface. Based on this knowledge, luminance variation in a widthwise direction of a road may be evaluated, and positions of right and left lane division lines in an image plane may be specified on the image plane. A position (x, y, z) in a real space of the lane division line may be calculated with a known coordinate conversion expression, based on a position (i, j) on the image plane and a parallax calculated regarding the position, that is, based on the distance information. In a coordinate system in the real space set with a position of the own vehicle as a reference, in this implementation, for example, as illustrated in FIG. 6, the road surface directly below a midpoint of the cameras may be an origin; a vehicle widthwise direction may be denoted by an X axis; a vehicle heightwise direction a Y axis; and a vehicle lengthwise direction (a distance direction) a Z axis. Here, an x-z plane (y=0) may coincide with the road surface if the road is flat. A road model may be expressed by dividing, in the distance direction, a travel lane of the own vehicle on the road into a plurality of sections, approximating, as prescribed, the right and the left lane division lines in each of the sections, and coupling together the approximated right and left lane division lines. Note that, in the implementation, the forgoing description is given on an example in which a shape of a travel road may be recognized based on images from a pair of cameras. However, this is illustrative and non-limiting. The shape of the travel road may be obtained based on image information from other kind of cameras such as a monocular camera or a camera that may perform color imaging. In one implementation, the forward environment recognition device 31 may serve as a "forward environment recognizer".

The steering controller 20 may perform a steering control, based on input signals as described above, according to a steering control program to be described later with reference to FIG. 3. In one specific but non-limiting instance, the steering controller 20 may set, based on the forward environment information, a target course to be traveled by the own vehicle, may calculate a target steering torque $T_{HT}$ that allows the own vehicle to travel along the target course, may calculate a steering torque $T_H$ based on the steering angle $\theta_H$, may variably set, in accordance with the vehicle speed V, a target steering torque speed-sensitive gain G1 of the target steering torque $T_{HT}$ and a steering torque speed-sensitive gain G2 of the steering torque $T_H$, may calculate the control torque $T_T$, based on the target steering torque $T_{HT}$ corrected based on the target steering torque speed-sensitive gain G1 thus variably set and the steering torque $T_H$ corrected based on the steering torque speed-sensitive gain G2 thus variably set, and may output the control torque $T_T$ to the motor driver 21 of the electric power steering motor 12 to execute the steering control. In one implementation, the target steering torque $T_{HT}$ may serve as a "first control quantity". In one implementation, the steering torque $T_H$ may serve as a "second control quantity". In one implementation, the control torque $T_T$ may serve as a "steering control quantity". In one implementation, the target steering torque speed-sensitive gain G1 may serve as a "first rate". In one implementation, the steering torque speed-sensitive gain G2 may serve as a "second rate".

Figure 2:
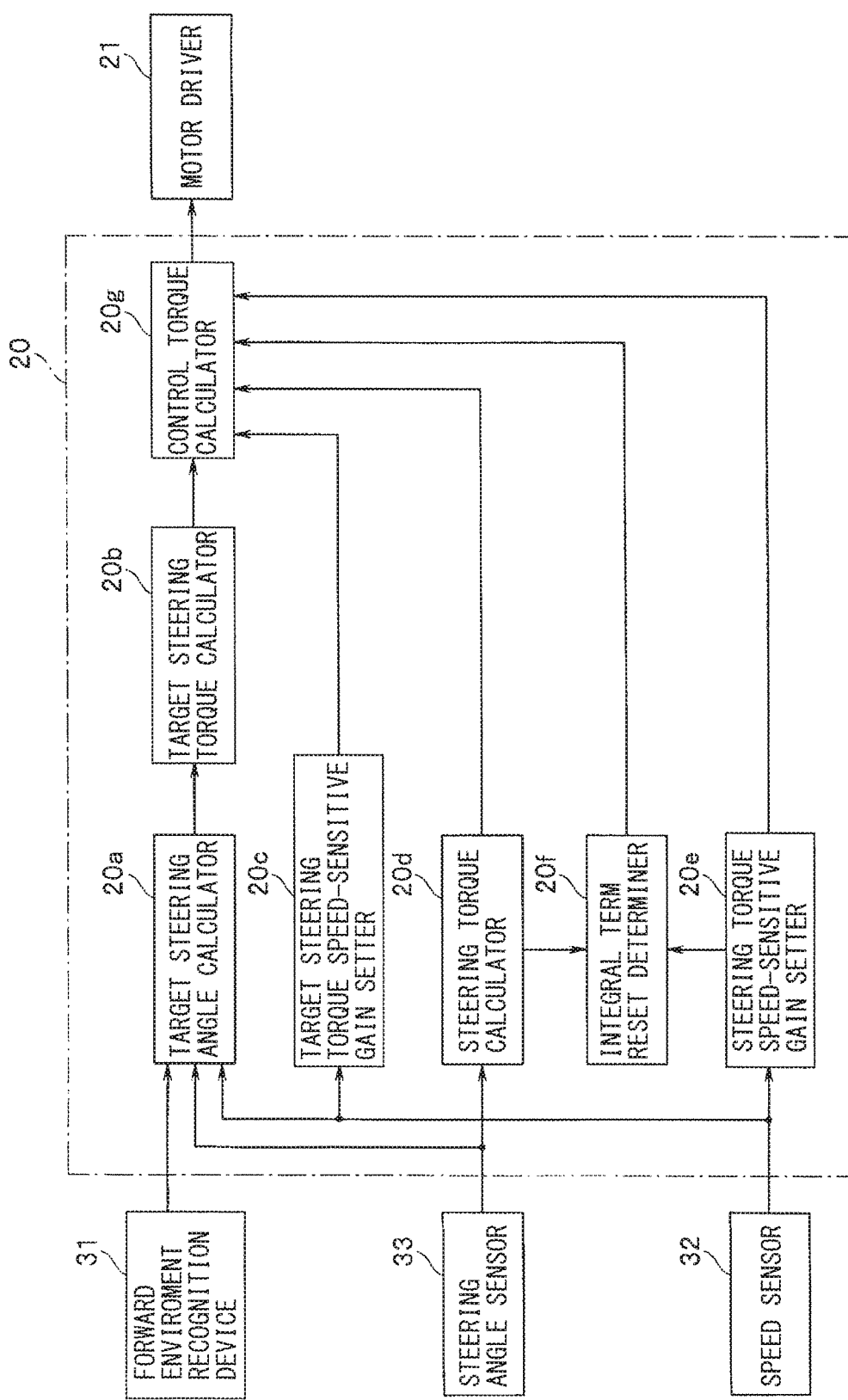
FIG. 2 is a functional block diagram of a steering controller according to an implementation of the technology.

The steering controller 20 may therefore include, as illustrated in FIG. 2, a target steering angle calculator 20a, a target steering torque calculator 20b, a target steering torque speed-sensitive gain setter 20c, a steering torque calculator 20d, a steering torque speed-sensitive gain setter 20e, an integral term reset determiner 20f, and a control torque calculator 20g, as its principal components.

The target steering angle calculator 20a may receive the forward environment information based on the image information as described above, from the forward environment recognition device 31. The forward environment information may include, for example, the shape of the road, i.e., lane division line (or lane line) position information, and information on three-dimensional objects including a preceding vehicle on the lane line. The target steering angle calculator 20a may receive the vehicle speed V from the speed sensor 32, and may receive the steering angle $\theta_H$ from the steering angle sensor 33.

Figure 4:
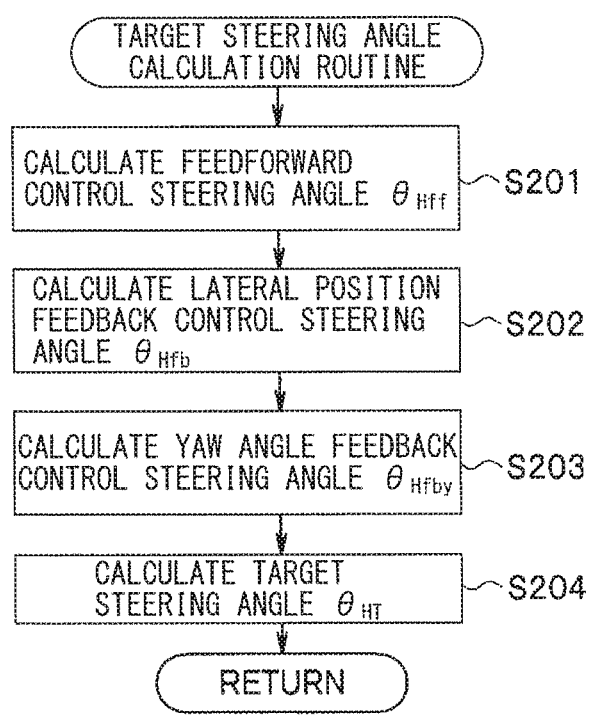
FIG. 4 is a flowchart of a target steering angle calculation routine according to an implementation of the technology.

The target steering angle calculator 20a may set the target course to perform a follow-up control of the own vehicle, according to, for example, a flowchart of a target steering angle calculation routine as illustrated in FIG. 4. In this implementation, the target course may be a center of the lane lines. The target steering angle calculator 20a may calculate the target steering angle $\theta_{HT}$ that allows for the follow-up control along the target course, and may output the target steering angle $\theta_{HT}$ to the target steering torque calculator 20b.

In the following, description is given, with reference to the flowchart in FIG. 4, on the target steering angle calculation routine executed in the target steering angle calculator 20a.

First, in step S201, a feedforward control steering angle $\theta_{Hff}$ may be calculated by, for example, the following expression (1).

$$\theta_{Hff} = G\theta_{ff} \cdot \kappa \qquad (1)$$

where κ denotes a curve curvature calculated based on the forward environment information and given by, for example, the following expression (2).

$$\kappa = (\kappa l + \kappa r)/2 \qquad (2)$$

Figure 5:
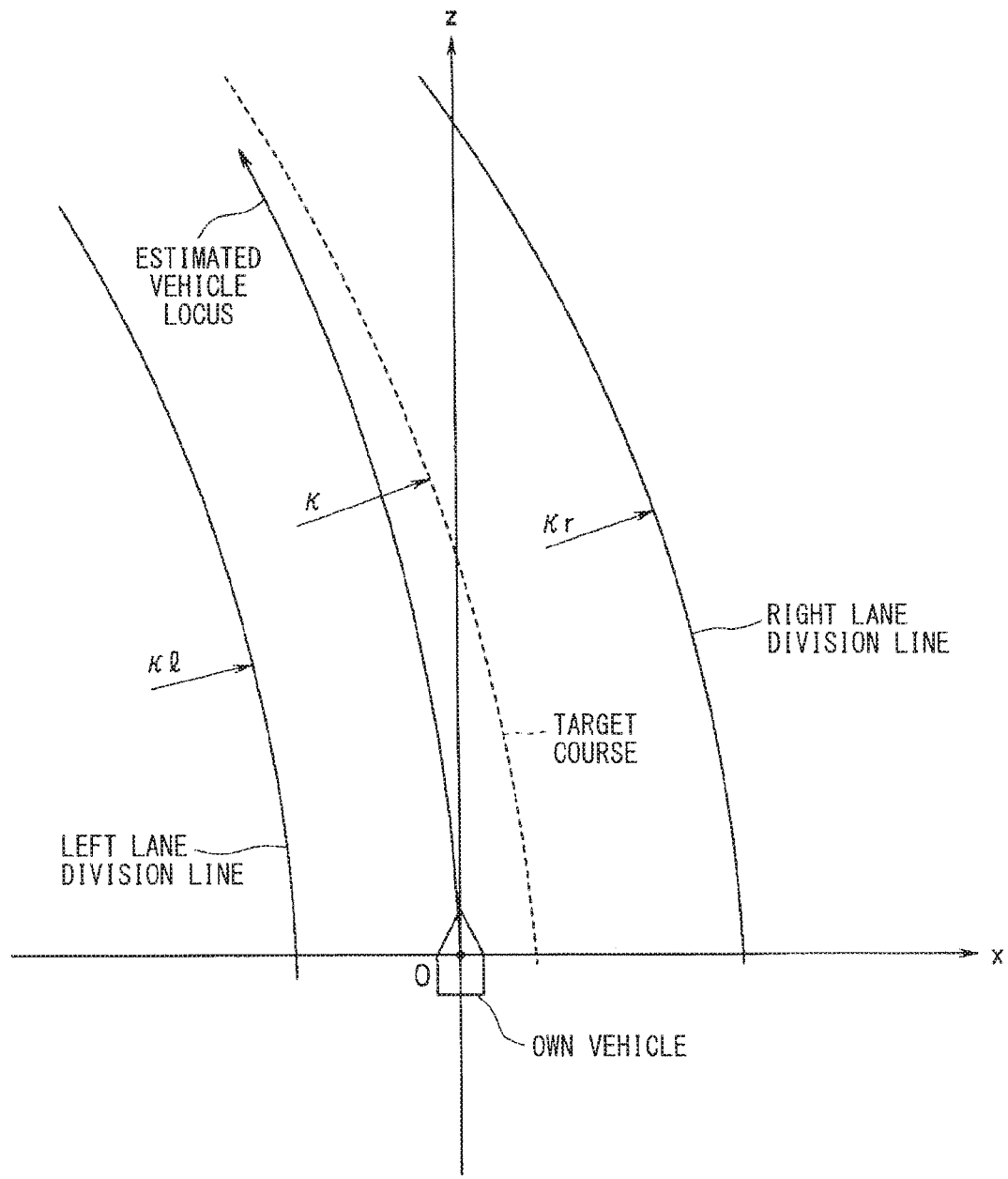
FIG. 5 illustrates a feedforward control according to an implementation of the technology.

In the expression (2), κl denotes a curvature component derived from the left lane division line, and κr denotes a curvature component derived from the right lane division line. The curvature components κl and κr of the right and the left lane division lines may be determined, specifically, with use of a coefficient of a quadratic term calculated by a quadratic least square method regarding points that constitute each of the right and the left lane division lines, as illustrated in FIG. 5. For example, when the lane division line is approximated by a quadratic expression: $x = A \cdot z^2 + B \cdot z + C$, a value of $2 \cdot A$ may be used as the curvature component. Note that curvatures of the respective lane division lines themselves may serve as curvature components κl and κr of the lane division lines. $G\theta_{ff}$ in the expression (1) denotes a feedforward gain preset by means of experiments, arithmetic operations, or other suitable methods.

Next, the flow may proceed to step S202, in which a lateral position feedback control steering angle $\theta_{Hfb}$ may be calculated by, for example, the following expression (3).

$$\theta_{Hfb} = G\theta_{fb} \cdot \Delta x \qquad (3)$$

where $G\theta_{fb}$ denotes a gain preset by means of experiments, arithmetic operations, or other suitable methods. Δx may be calculated, as illustrated in FIG. 6, by the following expression (4).

$$\Delta x = (xl + xr)/2 - xv \qquad (4)$$

In the expression (4), xv denotes an x coordinate of an estimated vehicle locus at a z coordinate of a forward gaze point (0, zv) of the vehicle. A forward gaze distance (a z coordinate) zv of the forward gaze point (0, zv) may be calculated, in the implementation, by an expression: $zv = T \cdot V$. Here, T denotes a preset prediction time, and may be set to, for example, 1.2 seconds.

Accordingly, when using, based on a vehicle travel state, vehicle specifications, a vehicle-specific stability factor As, or other data, xv may be calculated by, for example, the following expression (5).

$$xv = (1/2) \cdot (1/(1 + As \cdot V^2)) \cdot (\theta H/Lw) \cdot (T \cdot V)^2 \qquad (5)$$

where Lw denotes a wheelbase. In the expression (4), xl denotes an x coordinate of the left lane division line at the z coordinate of the forward gaze point (0, zv), and xr denotes an x coordinate of the right lane division line at the z coordinate of the forward gaze point (0, zv).

Note that xv as described above may be also calculated, with use of the vehicle speed V and a yaw rate (dθ/dt), by the following expression (6). Alternatively, xv may be calculated, based on the image information, by the following expression (7).

$$xv = (1/2) \cdot ((d\theta/dt)/V) \cdot (V \cdot T)^2 \qquad (6)$$

$$xv = (1/2) \cdot \kappa \cdot (V \cdot T)^2 \qquad (7)$$

Figure 7:
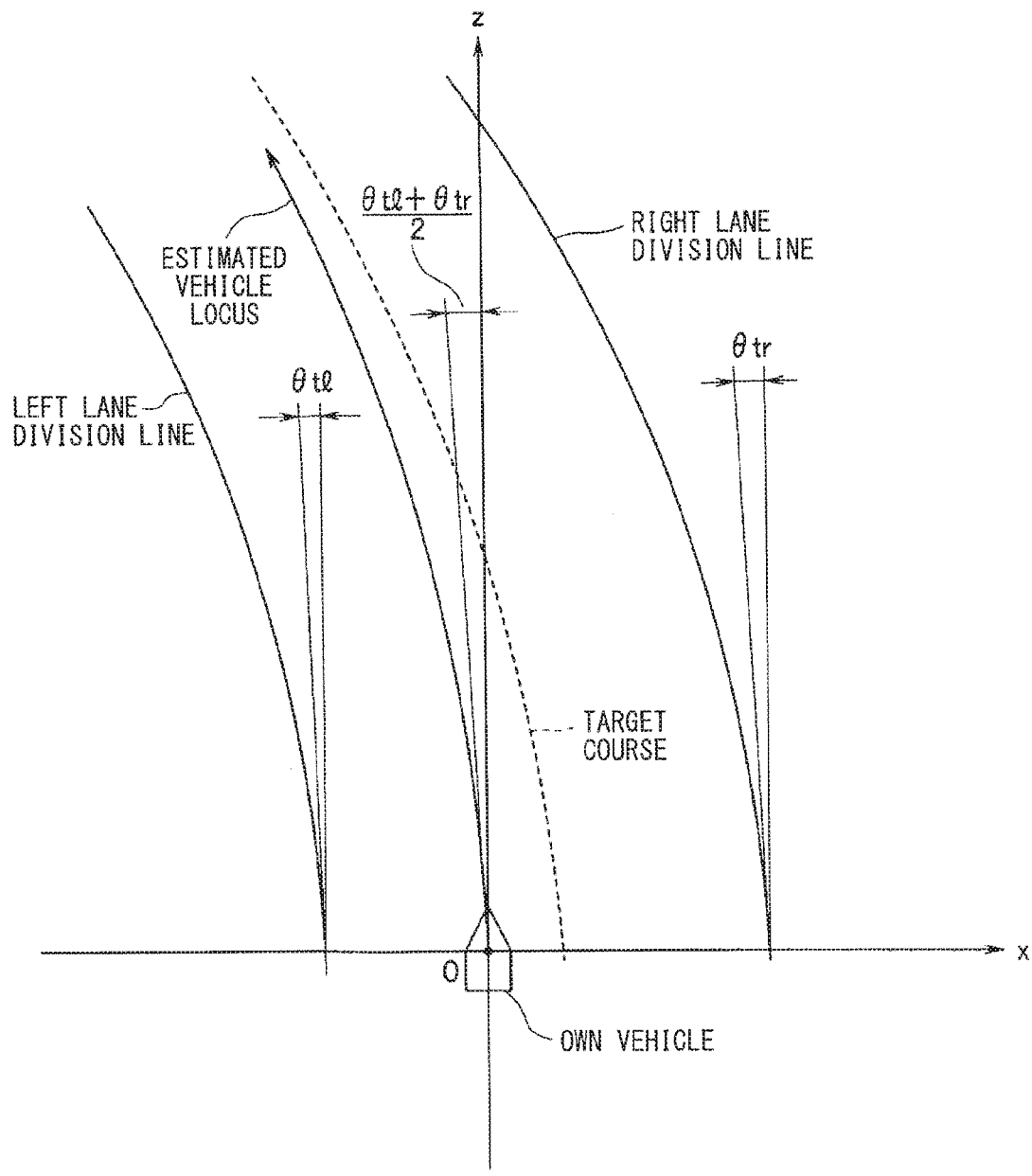
FIG. 7 illustrates a yaw angle feedback control according to an implementation of the technology.

Next, the flow may proceed to step S203, in which a yaw angle feedback control steering angle $\theta_{Hfby}$ may be calculated by, for example, the following expression (8). The yaw angle feedback control steering angle $\theta_{Htby}$ is provided for a feedback control in which a yaw angle of the vehicle is feedback-controlled to be a yaw angle along the target course.

$$\theta_{Hfby} = G\theta_{fby} \cdot (\theta tl + \theta tr)/2 \qquad (8)$$

where $G\theta_{fby}$ denotes a gain preset by means of experiments, arithmetic operations, or other suitable methods. θtl denotes inclination of the own vehicle with respect to the left lane division line, based on the image information from the forward environment recognition device 31, and θtr denotes inclination of the own vehicle with respect to the right lane division line, based on the image information from the forward environment recognition device 31 (refer to FIG. 7). Note that θtl and θtr may be calculated from a coefficient of a linear term (that is, a value of B in the approximation of the lane division line by the expression: $x = A \cdot z^2 + B \cdot z + C$) calculated by the quadratic least square method regarding each point of the lane division line obtained based on the image information.

Then, the flow may proceed to step S204, in which a target steering angle $\theta_{HT}$ may be calculated by, for example, the following expression (9), and the steering angle $\theta_{HT}$ thus calculated may be outputted to the target steering torque calculator 20b.

$$\theta_{HT} = \theta_{Hff} + \theta_{Hfb} + \theta_{Hfby} \qquad (9)$$

The target steering torque calculator 20b may receive the target steering angle $\theta_{HT}$ from the target steering angle calculator 20a. The target steering torque calculator 20b may convert the target steering angle $\theta_{HT}$ to the target steering torque $T_{HT}$, with reference to a preset map, or other conversion tables. The target steering torque calculator 20b may output the target steering torque $T_{HT}$ to the control torque calculator 20g. In one implementation, the target steering angle calculator 20a and the target steering torque calculator 20b may respectively serve as a "target course setter" and a "first control quantity calculator".

The target steering torque speed-sensitive gain setter 20c may receive the vehicle speed V from the speed sensor 32.

Figure 8:
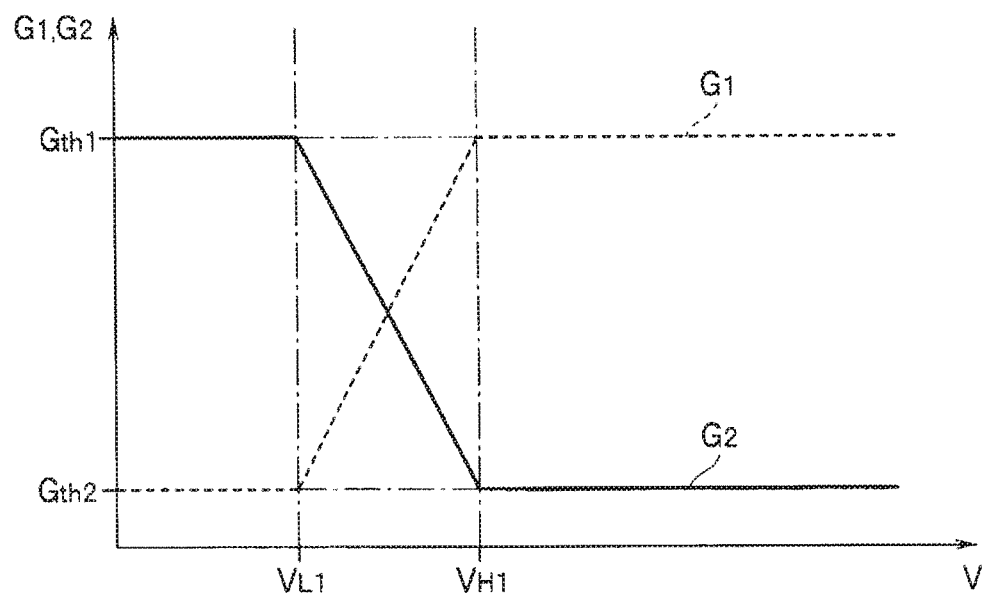
FIG. 8 illustrates one example of characteristics of a target steering torque speed-sensitive gain and a steering torque speed-sensitive gain according to an implementation of the technology.

Then, with reference to a map, for example, as illustrated in FIG. 8, preset by means of experiments, arithmetic operations, or other suitable methods, the target steering torque speed-sensitive gain setter 20c may set the target steering torque speed-sensitive gain G1 (a characteristic denoted by a broken line in FIG. 8), and may output, to the control torque calculator 20g, the target steering torque speed-sensitive gain G1 thus set.

As illustrated in FIG. 8, the target steering torque speed-sensitive gain G1 may be set to Gth2 (a small value close to substantially zero (0)) in a low-speed travel range in which the vehicle speed V is lower than a preset first speed VL1. The target steering torque speed-sensitive gain G1 may be set to Gth1 (a large value close to substantially one (1)) in a high-speed travel range in which the vehicle speed V is higher than a preset second speed VH1. In a medium-speed travel range in which the vehicle speed V is in a range from VL1 to VH1 both exclusive (VL1<V<VH1), that is, in a gain-transited speed range in which the target steering torque speed-sensitive gain G1 is transited, the target steering torque speed-sensitive gain G1 may be mildly or gradually variated in accordance with the vehicle speed V. In other words, as the vehicle speed V becomes higher, the target steering torque speed-sensitive gain G1 may be set to a larger value. The terms "mildly" and "gradually" as used herein are defined as not being steep or abrupt, and may be used interchangeably.

The steering torque calculator 20d may receive the steering angle $\theta_H$ from the steering angle sensor 33. Similarly to the target steering torque calculator 20b as described, the steering torque calculator 20d may convert the steering angle $\theta_H$ to the steering torque $T_H$, with reference to a preset map, or other conversion tables. The steering torque calculator 20d may output the steering torque $T_H$ thus converted, to the integral term reset determiner 20f and to the control torque calculator 20g. In one implementation, the steering torque calculator 20d may serve as a "second control quantity calculator".

The steering torque speed-sensitive gain setter 20e may receive the vehicle speed V from the speed sensor 32.

Then, with reference to a map, for example, as illustrated in FIG. 8, preset by means of experiments, arithmetic operations, or other suitable methods, the steering torque speed-sensitive gain setter 20e may set the steering torque speed-sensitive gain G2 (a characteristic denoted by a solid line in FIG. 8). The steering torque speed-sensitive gain setter 20e may output the steering torque speed-sensitive gain G2 thus set, to the integral term reset determiner 20f and to the control torque calculator 20g.

As illustrated in FIG. 8, the steering torque speed-sensitive gain G2 may be set to Gth1 (the large value close to substantially one (1)) in the low-speed travel range in which the vehicle speed V is lower than the preset first speed VL1. The steering torque speed-sensitive gain G2 may be set to Gth2 (the small value close to substantially zero (0)) in the high-speed travel range in which the vehicle speed V is higher than the preset second speed VH1. In the medium-speed travel range in which the vehicle speed V is in a range from VL1 to VH1 both exclusive (VL1<V<VH1), that is, in the gain-transited speed range in which the target steering torque speed-sensitive gain G2 is transited, the steering torque speed-sensitive gain G2 may be mildly or gradually variated in accordance with the vehicle speed V. In other words, as the vehicle speed V becomes higher, the steering torque speed-sensitive gain G2 may be set to a smaller value.

The integral term reset determiner 20f may receive the steering torque $T_H$ from the steering torque calculator 20d, and may receive the steering torque speed-sensitive gain G2 from the steering torque speed-sensitive gain setter 20e. The integral term reset determiner 20f may compare an absolute value $|T_H|$ of the steering to torque $T_H$ to an absolute value $|G2 \cdot T_H|$ of a value obtained by multiplying the steering torque $T_H$ by the steering torque speed-sensitive gain G2. When the absolute value $|T_H|$ of the steering torque $T_H$ is larger than the absolute value $|G2 \cdot T_H|$ ($|T_H|>|G2 \cdot T_H|$), the integral term reset determiner 20f may determine on establishment of a condition for resetting a multiplication term by the steering torque $T_H$, and may output a result of the determination to the control torque calculator 20g.

The control torque calculator 20g may receive the target steering torque $T_{HT}$ from the target steering torque calculator 20b, and may receive the target steering torque speed-sensitive gain G1 from the target steering torque speed-sensitive gain setter 20c. The control torque calculator 20g may receive the steering torque $T_H$ from the steering torque calculator 20d, and may receive the steering torque speed-sensitive gain G2 from the steering torque speed-sensitive gain setter 20e. The control torque calculator 20g may receive the result of the determination on the reset of the multiplication term, from the integral term reset determiner 20f.

Then, the control torque calculator 20g may calculate the control torque $T_T$ by, for example, the following expression (10), and may output the control torque $T_T$ thus calculated, to the motor driver 21.

$$T_T = G1 \cdot T_{HT} + G2 \cdot T_H \quad (10)$$

Here, in the expression (10) mentioned above, when the determination result of the reset of the multiplication term is inputted from the integral term reset determiner 20f an integral term $G2 \cdot T_H$ may be reset to prevent an increase in a steady-state deviation.

In one implementation, the target steering torque speed-sensitive gain setter 20c and the steering torque speed-sensitive gain setter 20e may serve as a "control rate variator". In one implementation, the integral term reset determiner 20f and the control torque calculator 20g may serve as a "steering controller".

Figure 3:
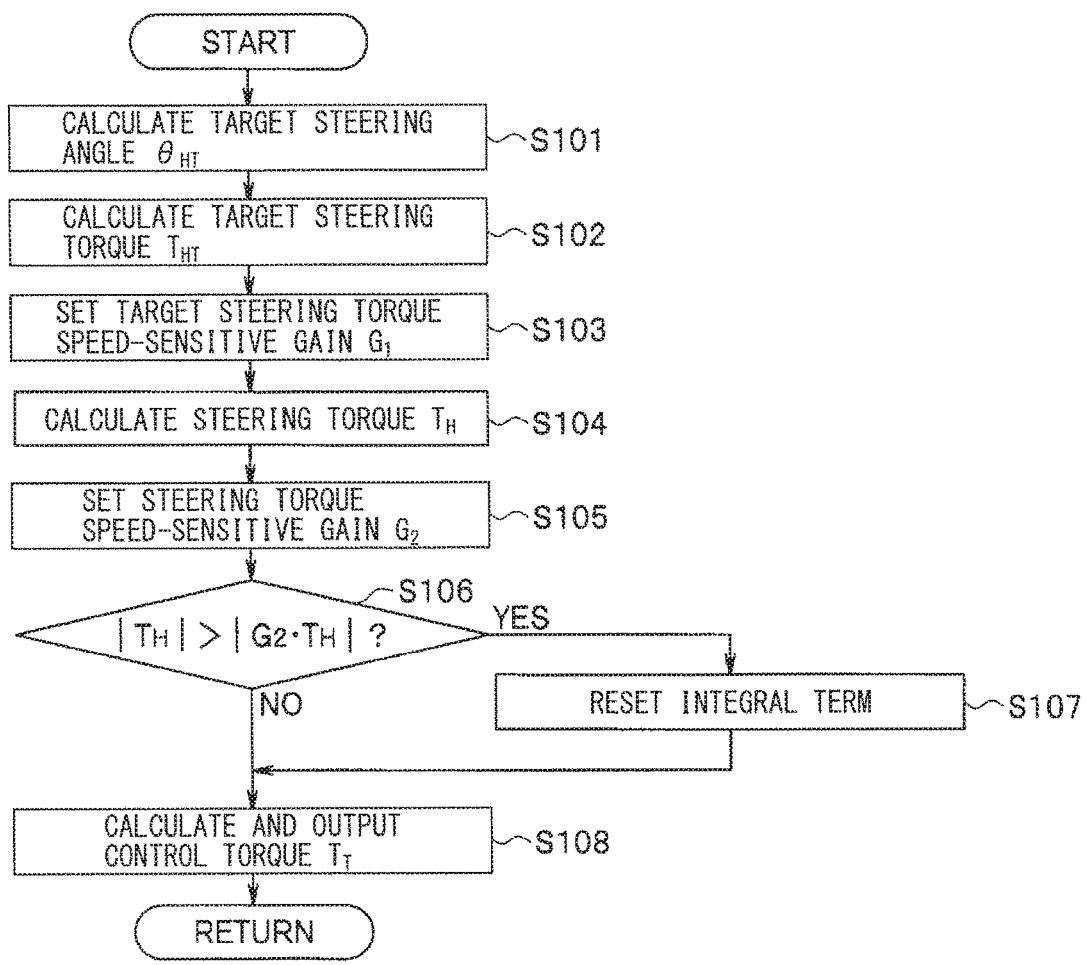
FIG. 3 is a flowchart of a steering control program according to an implementation of the technology.

Description is now given, with reference to a flowchart in FIG. 3, on the steering control of the steering controller 20 as configured above.

First, in step S101, the target steering angle $\theta_{HT}$ may be calculated by the forgoing expression (9), in the target steering angle calculator 20a.

Next, the flow may proceed to step S102, in which the target steering torque $T_{HT}$ may be calculated, in the target steering torque calculator 20b.

Subsequently, the flow may proceed to step S103, in which the target steering torque speed-sensitive gain G1 (the characteristic denoted by the broken line in FIG. 8) may be set, in the target steering torque speed-sensitive gain setter 20c.

Next, the flow may proceed to step S104, in which the steering torque $T_H$ may be calculated, in the steering torque calculator 20d.

Thereafter, the flow may proceed to step S105, in which the steering torque speed-sensitive gain G2 (the characteristic denoted by the solid line in FIG. 8) may be set, in the steering torque speed-sensitive gain setter 20e.

Then, the flow may proceed to step S106, in which the absolute value $|T_H|$ of the steering torque $T_H$ may be compared to the absolute value $|G2 \cdot T_H|$ of the value obtained by multiplying the steering torque $T_H$ by the steering torque speed-sensitive gain G2, in the integral term reset determiner 20f.

As a result of the comparison in step S106, when the absolute value $|T_H|$ of the steering torque $T_H$ is larger than the absolute value $|G2 \cdot T_H|$ ($|T_H|>|G2 \cdot T_H|$), the flow may proceed to step S107. In step S107, the integral term in the expression (10) as described above, i.e., an operation item $G2 \cdot T_H$ may be reset, in the control torque calculator 20g, in order to prevent an increase in a corrected torque obtained by the feedback control by means of the steering torque $T_H$ and to prevent the increase in the steady-state deviation. Then, the flow may proceed to step S108.

As a result of the comparison in step S106, when the absolute value $|T_H|$ of the steering torque $T_H$ is equal to or smaller than the absolute value $|G2 \cdot T_H|$ ($|T_H| \le |G2 \cdot T_H|$), the flow may proceed to step S108. Also, after the reset of the operation term $G2 \cdot T_H$ in step S107, the flow may proceed to step S108 as well. In step S108, the control torque $T_T$ may be calculated by the forgoing expression (10), and the control torque $T_T$ thus calculated may be outputted to the motor driver 21.

As described, the implementation of the technology involves: setting the target course to be traveled by the own vehicle; calculating h target steering torque $T_{HT}$ that allows the own vehicle to travel along the target course; calculating the steering torque $T_H$ based on the steering angle $\theta_H$; variably setting, in accordance with the vehicle speed V, the target steering torque speed-sensitive gain G1 of the target steering torque $T_{HT}$ and the steering torque speed-sensitive gain G2 of the steering torque $T_H$; and calculating the control torque $T_H$, based on the target steering torque $T_{HT}$ corrected based on the target steering torque speed-sensitive gain G1 thus variably set and the steering torque $T_H$ corrected based on the steering torque speed-sensitive gain G2 thus variably set. In one specific but non-limiting instance, the feedback control of the steering torque $T_H$ may be additionally provided, in which the target steering torque speed-sensitive gain G1 of the target steering torque $T_{HT}$ may be allowed to be lower than the steering torque speed-sensitive gain G2 of the steering torque $T_H$, in the low-speed travel range with the vehicle speed V being lower than the preset first speed VL1, and to be higher than the steering torque speed-sensitive gain G2 of the steering torque $T_H$, in the high-speed travel range with the vehicle speed V being higher than the preset second speed VH1. Hence, it is possible to perform a stable and precise control with alleviated changes in control responsiveness over low- to high-speed ranges in a follow-up control such as a lane deviation prevention control, a lane keeping control, and a preceding-vehicle follow-up control.

In the forgoing implementations, description is given on an instance that involves: setting the target course that allows the own vehicle to travel along the lane lines, based on the image data from the cameras; and performing the follow-up control to the target course. However, this is illustrative and non-limiting. It is to be appreciated that the technology may be also applicable to an instance that involves: setting the target course that allows the own vehicle to travel along the lane lines, based on a navigation system, map information, and information on a position of the own vehicle; and performing the follow-up control to the target course. The technology may be also applicable to an alternative instance that involves: recognizing a preceding vehicle by means of image information from a camera, a laser radar, a millimeter-wave radar, a sonar, or other detection systems; setting, as the target course, a route to follow the preceding vehicle thus recognized; and performing the follow-up control to the target course. Furthermore, the technology may be also applicable to still another instance that involves: recognizing a lane line along which the own vehicle is travelling, by means of a camera, a navigation system, map information, and information on the position of the own vehicle; setting, as the target course, a route to prevent deviation from the lane line thus recognized; and performing the follow-up control to the target course.

Also, in the forgoing implementations of the technology, description is given on an instance in which a value in the high-speed range of the target steering torque speed-sensitive gain G1 is equal to a value in the low-speed range of the steering torque speed-sensitive gain G2. However, this is illustrative and non-limiting. The value in the high-speed range of the target steering torque speed-sensitive gain G1 may be different from the value in the low-speed range of the steering torque speed-sensitive gain G2. Similarly, in the forgoing description, a value in the low-speed range of the target steering torque speed-sensitive gain G1 is equal to a value in the high-speed range of the steering torque speed-sensitive gain G2. However, the value in the low-speed range of the target steering torque speed-sensitive gain G1 may be different from the value in the high-speed range of the steering torque speed-sensitive gain G2. Furthermore, in the forgoing implementations, description is given on an instance in which the value in the high-speed range of the target steering torque speed-sensitive gain G1, the value in the low-speed range of the steering torque speed-sensitive gain G2, the value in the low-speed range of the target steering torque speed-sensitive gain G2, and the value in the high-speed range of the steering torque speed-sensitive gain G2 are constant values. However, this is illustrative and non-limiting, and these values are not limited to constant values.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle steering control apparatus, comprising:
    a target course setter that sets, based on forward environment information, a target course to be traveled by an own vehicle;
    a first control quantity calculator that calculates a first control quantity based on a target steering angle to allow the own vehicle to travel along the target course, the target steering angle being calculated based on the forward environment information;
    a second control quantity calculator that calculates a second control quantity, the second control quantity being based on a detected steering angle detected by a sensor of the own vehicle;
    a control rate variator that variably sets, in accordance with a vehicle speed, a first rate of the first control quantity in a steering control quality and a second rate of the second control quantity in the steering control quality; and
    a steering controller that calculates the steering control quantity, based on a first corrected control quantity that is set by correcting the first control quantity based on the first rate and a second corrected control quantity that is set by correcting the second control quantity based on the second rate, and executes a steering control of the own vehicle based on the steering control quantity.

2. The vehicle steering control apparatus according to claim 1, further comprising a forward environment recognizer that recognizes environment in front of the own vehicle to obtain the forward environment information.

3. The vehicle steering control apparatus according to claim 2, wherein the control rate variator raises the second rate of the second control quantity, in a low-speed travel range in which the vehicle speed is smaller than a preset first speed.

4. The vehicle steering control apparatus according to claim 2, wherein the control rate variator allows the second rate to be higher than the first rate, in a low-speed travel range in which the vehicle speed is smaller than a preset first speed.

5. The vehicle steering control apparatus according to claim 2, wherein the control rate variator raises the first rate of the first control quantity, in a high-speed travel range in which the vehicle speed exceeds a preset second speed.

6. The vehicle steering control apparatus according to claim 2, wherein the control rate variator allows the first rate to be higher than the second rate, in a high-speed travel range in which the vehicle speed exceeds a preset second speed.

7. The vehicle steering control apparatus according to claim 2, wherein the control rate variator allows the first rate of the first control quantity and the second rate of the second control quantity to be gradually variated in accordance with the vehicle speed, in a rate-variated speed range in which the first rate of the first control quantity and the second rate of the second control quantity are variated.

8. The vehicle steering control apparatus according to claim 2, wherein, when the control rate variator variably sets, in accordance with the vehicle speed, the second rate of the second control quantity to cause a decrease in an absolute value of the second control quantity, the steering controller resets an integral term of the second control quantity corrected based on the second rate, to calculate the steering control quantity.

9. The vehicle steering control apparatus according to claim 1, wherein the control rate variator raises the second rate of the second control quantity, in a low-speed travel range in which the vehicle speed is smaller than a preset first speed.

10. The vehicle steering control apparatus according to claim 1, wherein the control rate variator allows the second rate to be higher than the first rate, in a low-speed travel range in which the vehicle speed is smaller than a preset first speed.

11. The vehicle steering control apparatus according to claim 1, wherein the control rate variator raises the first rate of the first control quantity, in a high-speed travel range in which the vehicle speed exceeds a preset second speed.

12. The vehicle steering control apparatus according to claim 1, wherein the control rate variator allows the first rate to be higher than the second rate, in a high-speed travel range in which the vehicle speed exceeds a preset second speed.

13. The vehicle steering control apparatus according to claim 1, wherein the control rate variator allows the first rate of the first control quantity and the second rate of the second control quantity to be gradually variated in accordance with the vehicle speed, in a rate-variated speed range in which the first rate of the first control quantity and the second rate of the second control quantity are variated.

14. The vehicle steering control apparatus according to claim 1, wherein, when the control rate variator variably sets, in accordance with the vehicle speed, the second rate of the second control quantity to cause a decrease in an absolute value of the second control quantity, the steering controller resets an integral term of the second control quantity corrected based on the second rate, to calculate the steering control quantity.

15. The vehicle steering control apparatus according to claim 1, wherein the control rate variator is configured to set the first rate and the second rate so that:
- in a low-speed travel range in which the vehicle speed is smaller than a preset first speed, the first rate is set at a first constant value and the second rate is set at a second constant value, and the second constant value is higher than the first constant value,
- in a high-speed travel range in which the vehicle speed exceeds a preset second speed, the first rate is set at a third constant value and the second rate is set at a forth constant value, and the third constant value is higher than the forth constant value,
- in a medium-speed travel range in which the vehicle speed exceed the preset first speed and is smaller than preset second speed, the first rate is increased gradually in accordance with the vehicle speed from the first constant value to the third constant value and the second rate is decreased gradually in accordance with the vehicle speed from the second constant value to the forth constant value.

16. The vehicle steering control apparatus according to claim 15, wherein the control rate variator is configured to set the first rate and the second rate so that the third constant value is equal to the second constant value.

17. The vehicle steering control apparatus according to claim 1,
wherein the first control quantity calculator is configured to convert the target steering angle to the first control quantity; and
wherein the second control quantity calculator is configured to convert the detected steering angle to the second control quantity.

* * * * *